(12) United States Patent
Inami et al.

(10) Patent No.: US 9,677,613 B2  
(45) Date of Patent: Jun. 13, 2017

(54) SLIDE MEMBER

(71) Applicant: DAIDO METAL COMPANY LTD., Nagoya-shi, Aichi-ken (JP)

(72) Inventors: Shigeru Inami, Inuyama (JP); Colin McAleese, Inuyama (JP); Koji Zushi, Inuyama (JP)

(73) Assignee: DAIDO METAL COMPANY LTD., Nagoya-Shi, Aichi-Ken (JP)

( * ) Notice: Subject to any disclaimer, the term of this patent is extended or adjusted under 35 U.S.C. 154(b) by 152 days.

(21) Appl. No.: 14/618,091

(22) Filed: Feb. 10, 2015

(65) Prior Publication Data

US 2015/0226260 A1    Aug. 13, 2015

(30) Foreign Application Priority Data

Feb. 10, 2014  (JP) ................ 2014-023237

(51) Int. Cl.
F16C 33/04 (2006.01)
F16C 33/16 (2006.01)
F16C 9/02 (2006.01)

(52) U.S. Cl.
CPC ............ F16C 33/16 (2013.01); F16C 33/043 (2013.01); *F16C 9/02* (2013.01); *F16C 2202/04* (2013.01); *F16C 2202/06* (2013.01); *F16C 2206/04* (2013.01)

(58) Field of Classification Search
USPC .................................. 428/217, 408
See application file for complete search history.

(56) References Cited

U.S. PATENT DOCUMENTS 6,562,445 B2 * 5/2003 Iwamura ............... C23C 28/046  
428/408  
7,947,372 B2 * 5/2011 Dekempeneer ..... C23C 16/0272  
428/408

FOREIGN PATENT DOCUMENTS

| DE | 102008037871 A1 | 2/2010 |
| JP | 2004-269991 | * 9/2004 |
| JP | 2006-008853 A | 1/2006 |
| JP | 2008-001951 | * 1/2008 |
| JP | 2008-081630 | * 4/2008 |
| JP | 2009-013192 A | 1/2009 |

OTHER PUBLICATIONS

German office action mailed Jul. 28, 2016, in connection with German Patent Application 102015101782.2, and translation thereof.

* cited by examiner

*Primary Examiner* — Archene Turner  
(74) *Attorney, Agent, or Firm* — Browdy and Neimark, PLLC

(57) ABSTRACT

A slide member provided with a substrate; and a slide layer provided in a surface side of the substrate is disclosed. The slide layer includes a soft layer in the surface side and a DLC layer in the under surface side of the soft layer. The soft layer has a Young's modulus E ranging from 6 to 30 GPa, hardness Ht ranging from 0.2 to 3.0 GPa, and a value of ratio [E/Ht] of the foregoing ranging from 10 to 30. The DLC layer has a hardness Hd ranging from 5 to 60 GPa.

2 Claims, 3 Drawing Sheets

| EXAMPLE | SOFT LAYER | | | | | DLC LAYER | | | Hd*T T≤2 | Hd*(T-2) 2<T≤3.2 | μb | Vm |
| --- | --- | --- | --- | --- | --- | --- | --- | --- | --- | --- | --- | --- |
| | TYPE | E GPa | Ht GPa | E/Ht | T μm | TYPE | Hd GPa | Td μm | | | - | mm/s |
| 1 | DLC | 30 | 3.0 | 10 | 10.0 | H | 5 | 5 | - | 40 | 0.24 | 85 |
| 2 | PLC | 30 | 2.0 | 15 | 0.2 | Me | 20 | 3 | 4 | - | 0.26 | 75 |
| 3 | Gr | 14.4 | 1.2 | 12 | 8.0 | H FREE | 60 | 1 | - | 360 | 0.22 | 80 |
| 4 | DLC | 17.6 | 0.8 | 22 | 0.5 | F | 5 | 5 | 2.5 | - | 0.22 | 70 |
| 5 | PLC | 25 | 1.0 | 25 | 0.2 | H | 20 | 3 | 4 | - | 0.24 | 65 |
| 6 | Gr | 6 | 0.2 | 30 | 0.05 | H FREE | 60 | 1 | 3 | - | 0.20 | 60 |
| 7 | DLC | 30 | 3.0 | 10 | 2.5 | H | 5 | 5 | - | 2.5 | 0.18 | 60 |
| 8 | PLC | 30 | 2.0 | 15 | 0.3 | Me | 20 | 3 | 6 | - | 0.16 | 50 |
| 9 | Gr | 14.4 | 1.2 | 12 | 2.1 | H FREE | 60 | 1 | - | 6 | 0.12 | 55 |
| 10 | DLC | 17.6 | 0.8 | 22 | 1.5 | F | 5 | 5 | 7.5 | - | 0.16 | 50 |
| 11 | PLC | 25 | 1.0 | 25 | 0.3 | H | 20 | 3 | 6 | - | 0.18 | 40 |
| 12 | Gr | 6 | 0.2 | 30 | 0.5 | H FREE | 60 | 1 | 30 | - | 0.14 | 30 |

| COMPARATIVE EXAMPLE | SOFT LAYER | | | | | DLC LAYER | | | | | μb | Vm |
| --- | --- | --- | --- | --- | --- | --- | --- | --- | --- | --- | --- | --- |
| | TYPE | E GPa | Ht GPa | E/Ht | T μm | TYPE | Hd GPa | Td μm | | | - | mm/s |
| 1 | NONE | - | - | - | - | H | 20 | 3 | - | - | 0.36 | 120 |
| 2 | DLC | 50 | 10.0 | 5 | 2.0 | H | 20 | 3 | - | - | 0.33 | 120 |
| 3 | Gr | 10.5 | 0.3 | 35 | 2.0 | H | 20 | 3 | - | - | 0.32 | 140 |
| 4 | PLC | 40 | 2.0 | 20 | 2.0 | H | 20 | 3 | - | - | 0.26 | 140 |

FIG. 4

SLIDE MEMBER

CROSS-REFERENCE TO RELATED APPLICATION(S)

This application is based upon and claims the benefit of priority from Japanese Patent Application No. 2014-023237, filed on, Feb. 10, 2014 the entire contents of which are incorporated herein by reference.

FIELD

The present invention relates to a slide member provided with a substrate and a slide layer formed of multiple layers provided in the surface side of the substrate.

BACKGROUND

A slide bearing for supporting a crank shaft is used as a slide member in applications such as engines, etc. for automobiles. The slide member lubricates in the presence of a lubricant. Oil is used as a typical lubricant. In such type of slide member, a diamond-like-carbon (DLC) layer is typically provided over a bearing alloy layer backed by metal. The bearing alloy layer serves as a substrate and is typically formed of materials such as a copper alloy. The structure provided with the DLC layer exhibits improved wear resistance.

For example, Japanese Patent Publication No. 2006-8853 A discloses a first slide member which may also be hereinafter referred to as a first conventional example. The first slide member is formed of a substrate and a hard carbon coating provided over the substrate. The hard carbon coating is formed of a laminate of a hard layer and a soft layer. The surface of the hard carbon coating is polished so that the hard layer in the lower layer of the laminate is exposed to provide a smooth sliding surface. Japanese Patent Publication No. 2009-13192 A discloses a second slide member which may also be hereinafter referred to as a second conventional example. The second slide member is formed of a substrate, a carbon nitride film (a-CNx film) provided over the substrate, and an amorphous carbon coating film provided over the carbon nitride film.

A slide member or a bearing for example provided with a DLC layer on its surface worked well without being damaged in a conventional engine environment. Nowadays, however, engines are required to provide further improved performance and functionalities. Especially in an environment where starting and stopping of the engine is repeated on a frequent basis such as in a hybrid automobile application, the slide member is exposed to increasingly severe conditions. Thus, further improvement is required in the wear properties of the slide member. For improvement in the wear properties of the slide member, it is important to reduce the friction coefficient in the boundary lubrication regime and accelerate the transition to the mixed lubrication regime.

The first slide member attempts to reduce the friction coefficient by smoothening its surface but does not allow oil to be drawn easily to the slide surface, making it difficult for an oil film to form. Thus, the first slide member exhibited high friction coefficient in the boundary lubrication regime. The second slide member achieves reduced friction coefficient in the boundary lubrication regime but fails to conform with the counter element since the conforming layer is too thin and thus, is not able to form an oil film. It is thus not possible to accelerate the transition to the mixed lubrication regime. The second slide member requires a nitrogen atmosphere and therefore is not intended for application to a slide bearing used with oil.

SUMMARY

It is thus, one object of the present invention to provide a slide member having a substrate and a DLC layer provided over the substrate which is capable of reducing the friction coefficient in the boundary lubrication regime and accelerating the transition from the boundary lubrication regime to the mixed lubrication regime.

Inventors of the present invention conducted diligent research in order to achieve reduced friction coefficient in the boundary lubrication regime and early transition to the mixed lubrication regime in a slide member provided with a DLC layer over a substrate. As a result, a laminate in which a soft layer is provided over a surface portion of the DLC layer was found to be effective. It was further found to be effective to control the physical properties of the soft layer and the DLC layer. The physical properties include the Young's modulus, hardness, and the ratio of the foregoing properties. These findings allowed improvement of wear properties in the boundary lubrication regime and facilitated oil drawing, in other words, the formation of oil film and led to the present invention. The hardness and the Young's modulus referred to in the present invention are numerical values which may be obtained by a nano-indentor known in the art.

The slide member of the present invention is provided with a substrate and a slide layer provided in a surface side of the substrate. The slide layer includes a soft layer primarily comprising carbon and being provided in a surfacemost portion of the slide layer. The soft layer has a Young's modulus E ranging from 6 to 30 GPa, hardness Ht ranging from 0.2 to 3.0 GPa, and a value of ratio of Young's modulus E to hardness Ht given by E/Ht ranging from 10 to 30. The slide layer further includes a diamond-like-carbon layer being provided directly under the soft layer and having a hardness Hd ranging from 5 to 60 GPa.

In the above described structure, a soft layer primarily comprising carbon is provided in the surfacemost portion of the slide layer. The slide layer is disposed over a hard DLC layer having a predetermined hardness. The laminated structure achieves an appropriate level of initial conformability with the counter element in the boundary lubrication regime. The boundary lubrication regime is a state where there is frequent occurrence of direct contact between the slide member and the counter element because the oil film between the slide layer and the counter element is extremely thin. Initial conformability indicates the susceptibility of deforming into the shape of the counter element at an early stage of operation. It is thus, possible to inhibit ploughing and adhesion and thereby significantly reduce the friction coefficient. A value of ratio of Young's modulus to hardness obtained by Young's modulus E/hardness Ht have been further defined. As a result, is possible to make early transition to the mixed lubrication regime and further reduce the friction coefficient. The mixed lubrication regime is a state where a thin oil film is formed between the slide layer and the counter element and direct contact between the slide layer and the counter element is also observed.

The DLC layer is required to have a hardness Hd ranging from 5 to 60 GPa. The Young's modulus E to hardness Ht of the soft layer is obtained by a nano-indentor and the Young's modulus E ranges from 6 to 30 GPa and hardness Ht ranges from 0.2 to 3.0 GPa. It is further important that the value of ratio [E/Ht] of the two parameters range from 10 to 30. The value of ratio [E/Ht] preferably range from 20 to 30 for higher productivity which is typically evaluated by yield. In contrast, when the value of ratio [E/Ht] of the soft layer is less than 10, hardness is excessive with respect to the Young's modulus. Thus, initial conforming is not achieved as there is hardly any wear and is less effective in reducing the friction of coefficient in the boundary lubrication regime. When the value of ratio [E/Ht] exceeds 30 on the other hand, there is not enough hardness relative to the Young's Modulus and thus, increases the susceptibility to conform or wear and achieves low friction coefficient in the boundary lubrication regime. However, oil film is not easily formed since oil is not easily drawn in such configuration.

The inventors have conducted a ball on disc test to examine the relation between the speed of drawing oil and the coefficient of friction for 3 different types of soft layers namely, EXAMPLE A, COMPARATIVE EXAMPLE B, and COMPARATIVE EXAMPLE C. FIG. 1 indicates one example of the result of the ball on disc test presented as a Stribeck chart. In EXAMPLE A, the value of ratio [E/Ht] is 0≤E/Ht≤30. In COMPARATIVE EXAMPLE B, the value of ratio [E/Ht] is E/Ht<10. In COMPARATIVE EXAMPLE C, the value of ratio [E/Ht] is 30<E/Ht. FIGS. 2A, 2B, and 2C are cross-sectional views schematically illustrating the initial conforming or wear of the soft layer in EXAMPLE A, COMPARATIVE EXAMPLE B, and COMPARATIVE EXAMPLE C.

In COMPARATIVE EXAMPLE B having a relatively hard soft layer, initial conforming is not achieved, meaning that appropriate wear does not occur, as illustrated in FIG. 2B and thus, friction coefficient (μ) is large in the boundary lubrication regime as indicated in FIG. 1. In COMPARATIVE EXAMPLE C in which the soft layer is too soft, initial conforming is sufficiently achieved as illustrated in FIG. 2C. Thus, the friction coefficient can be reduced in the boundary lubrication regime as indicated in FIG. 1. However, the oil film is prone to break and thus, delays the start of decrease of friction coefficient in the mixed lubrication regime. In contrast, EXAMPLE A of the present invention achieves appropriate initial conformability as illustrated in FIG. 2A and also facilitates oil film formation. As a result, EXAMPLE A is capable of reducing the friction coefficient in the boundary lubrication regime as illustrated in FIG. 1. EXAMPLE A is further capable of reducing the speed at which the friction of coefficient begins to decrease and allows early transition to the mixed lubrication regime. It is thus, possible to improve the friction properties even more effectively in EXAMPLE A.

The DLC layer of the present invention is a layer primarily comprising an amorphous body having a diamond and graphite structure. More specifically, it possible to employ various types of DLC such as metal containing DLC, fluorine containing DLC, hydrogen containing DLC, and hydrogen-free DLC. DLC layer may be formed over the substrate by CVD (Chemical Vapor Deposition), PVD (Physical Vapor Deposition), or the like. It is possible to control the Young's modulus, hardness, and thickness of the DLC layer by controlling the film forming conditions such as output and gas conditions. The DLC layer requires hardness Hd ranging from 5 to 60 GPa.

The soft layer of the present invention is primarily formed of carbon and may employ a DLC structure, a polymer-like-carbon (PLC) structure, or a graphite (Gr) structure. Hydrogen containing DLC or hydrogen-free DLC is preferably employed as the DLC. Hydrogen containing PLC is preferably employed as the PLC. The soft layer may be formed by CVD (Chemical Vapor Deposition), PVD (Physical Vapor Deposition), or the like. It is possible to control the Young's modulus, hardness, and thickness of the soft layer by controlling the film forming conditions such as output and gas conditions. The soft layer may further employ a graphene structure, a carbon nanotube structure, a fullerene structure, or the like. In such case, the soft layer may be rendered free of a resin overlay. The resin overlay is a layer formed of a solid lubricant (such as $MoS_2$, $WS_2$, or the like) and a binder resin. The thickness of the soft layer may range for example from 0.05 to 10.0 μm.

In the present invention, the substrate is a structure over which the slide layer is provided. For example, the substrate may be formed of a metal back and a bearing alloy layer provided over the metal back. The slide layer may be provided over the bearing alloy layer. An intermediate layer may be provided between the bearing alloy layer and the DLC layer. For example, the intermediate layer may be formed of an adhesive layer, another DLC layer, or the like. The bearing alloy layer may be formed primarily of Al, Cu, or the like.

In the present invention, the relation between the thickness T (μm) of the soft layer and hardness Hd (GPa) of the DLC layer satisfies Hd×T≥6 when T≤2 and Hd×(T−2)≤6 when 2<T≤3.2.

According to the research conducted by the inventors, thickness T of the soft layer and hardness Hd of the underlying DLC layer is preferably configured to satisfy the above described formulae. It has been verified that the above described configuration improves the friction properties more effectively through reduction of friction coefficient in the boundary lubrication regime and early transition to the mixed lubrication regime.

BRIEF DESCRIPTION OF THE DRAWINGS

FIG. 4 is one example of a chart indicating the ball-on-disc test results.

DESCRIPTION

The present invention is described hereinafter with reference to the drawings through an embodiment of a slide bearing application used for example in a crankshaft of an automobile engine. As later described, EXAMPLES 1 to 12 indicated in the accompanying FIG. 4 are slide members, or slide bearings for example, according to the present embodiment.

Figure 1:
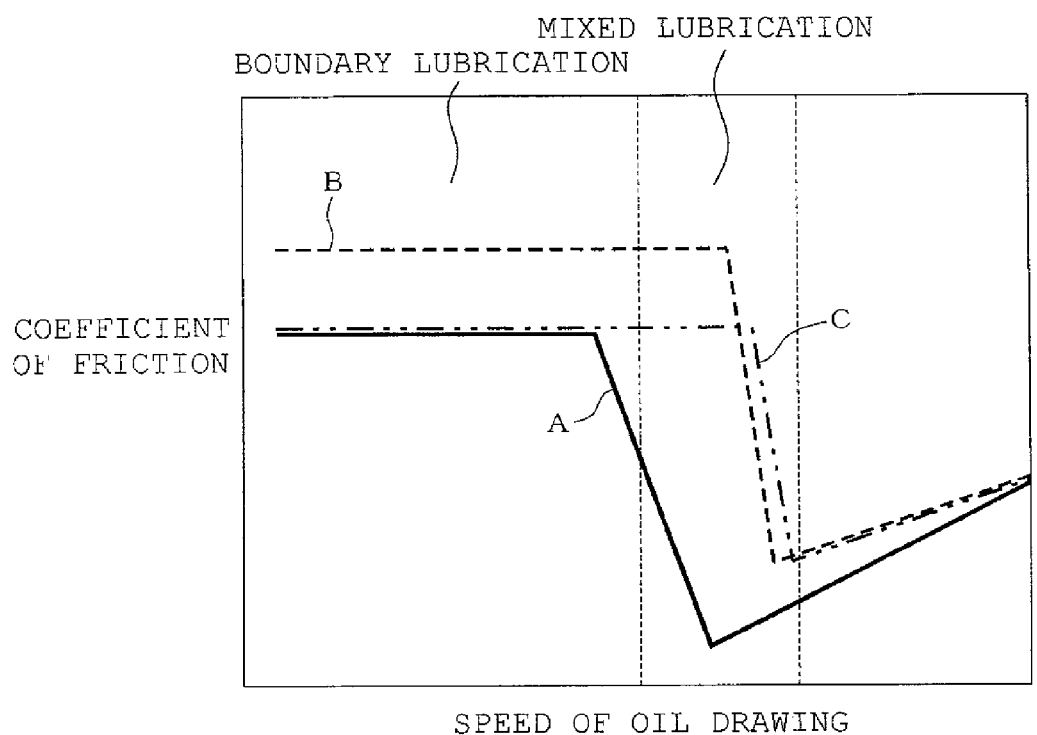
FIG. 1 is a chart briefly indicating the results of tests conducted to examine the relation between the speed of oil drawing and friction coefficient for 3 different types of soft layers.
Figure 2A:
FIG. 2A is a cross-sectional view schematically illustrating the initial conforming or wear of the soft layer of EXAMPLE A according to the present invention.
Figure 2B:
FIG. 2B is a cross-sectional view schematically illustrating the initial conforming or wear of the soft layer of COMPARATIVE EXAMPLE B according to the present invention.
Figure 2C:
FIG. 2C is a cross-sectional view schematically illustrating the initial conforming or wear of the soft layer of COMPARATIVE EXAMPLE C according to the present invention.
Figure 3:
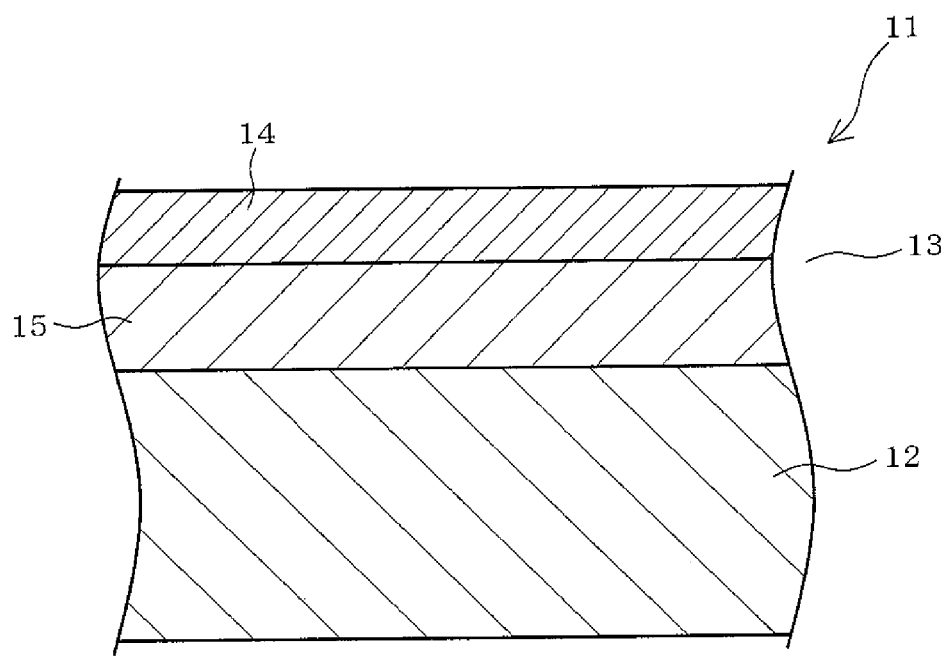
FIG. 3 illustrates one embodiment of the present invention and is a cross-sectional view schematically illustrating the structure of a slide member.

FIG. 3 schematically illustrates the structure of slide member 11 of the present embodiment. One example of slide member 11 may be a slide bearing. Slide member 11 is provided with substrate 12 and slide layer 13 provided over the surface side, i.e. the upper surface side of substrate 12. Slide layer 13 includes multiple layers. In the present embodiment, soft layer 14 is provided in the surface side, in other words, the surfacemost portion of slide layer 13 which slides with the counter element such as a crankshaft not shown. Soft layer 14 is primarily formed of carbon. DLC layer 15 is provided directly under soft layer 14 and thus, slide layer 13 is a double layered structure.

Though not illustrated in detail, substrate 12 includes a metal back made of steel for example. A bearing alloy layer is provided over the upper surface, in other words, the sliding surface side of the metal back. The bearing alloy layer may be formed of for example Al, Al alloy, Cu, Cu alloy, or the like. An intermediate layer may be provided between substrate 12, i.e. bearing alloy layer, and DLC layer 15. For example, the intermediate layer may be formed of another DLC layer, or the like.

Soft layer 14 is a film primarily formed of carbon. More specifically, soft layer 14 employs a DLC, a PLC, or a Gr structure. Thickness T of soft layer 14 may range from 0.05 to 10.0 μm. Young's modulus E of soft layer 14 ranges from 6 to 30 GPa, hardness Ht of soft layer 14 ranges from 0.2 to 3.0 GPa, and the value of ratio [E/Ht] of the two values range from 10 to 30.

DLC layer 15 may employ a metal containing DLC, a fluorine containing DLC, a hydrogen containing DLC, and a hydrogen-free DLC which are represented as Me, F, H, and H Free, respectively in the later described chart provided in FIG. 4. For example, thickness Td of DLC layer 15 ranges from 1.0 to 5.0 μm and hardness Hd of DLC layer 15 ranges from 5 to 60 GPa.

Though only applicable to EXAMPLES 7 to 12 of the present embodiment, the relation between the thickness T (μm) of soft layer 14 and hardness Hd (GPa) of DLC layer 15 satisfies Hd×T≥6 when T≤2 and Hd×(T−2)≤6 when 2<T≤3.2.

Slide member 11 described above is manufactured for example by the following process. First, a bearing alloy layer primarily comprising Cu or Al was formed over a metal back formed of steel. As a result, the so-called bimetallic substrate 12 was obtained. Substrate 12 was molded into a semi-cylindrical or a cylindrical shape. The surface of the molded substrate 12 was finished for example by boring or broaching.

DLC layer 15 was formed over substrate 12, more specifically over the bearing alloy layer, by plasma CVD or PVD. Soft layer 14 was further formed over DLC layer 15 by plasma CVD or PVD. It is possible to control the Young's modulus, hardness, and the thickness of soft layer 14 through adjustment of film forming conditions such as output, gas conditions, and the like. More specifically, in the present embodiment, DLC layer 15 was formed by sputtering, which is one example of PVD. Then, soft layer 14 with controlled Young's modulus, hardness, and thickness was formed.

The inventors of the present invention conducted a ball-on-disc test known in the art based on slide member 11 of the present embodiment in order to examine the friction coefficient in the boundary lubrication regime and the speed of transition to the mixed lubrication regime. In conducting the test, 16 types of test pieces were prepared including EXAMPLES 1 to 12 which are examples of the present invention and COMPARATIVE EXAMPLES 1 to 4 for comparison with the EXAMPLES as indicated in FIG. 4. The test pieces were each configured for example as a disc having a diameter of 46 mm. A Cu-alloy bearing alloy layer was used as indicated in FIG. 4. FIG. 4 indicates the test results as well as the features of EXAMPLES 1 to 12 and COMPARATIVE EXAMPLES 1 to 4 namely, type of soft layer 14, Young's modulus E, hardness Ht, value of ratio [E/Ht], thickness T, type of DLC layer 15, hardness Hd, and thickness Td.

In EXAMPLES 1 to 12, soft layer 14 comprising DLC, PLC, or Gr is provided over DLC layer 15, more specifically over the surfacemost portion of DLC layer 15. DLC layer 15 has a predetermined hardness Hd and thickness Td. Soft layer 14 has a predetermined thickness T. EXAMPLES 1 to 12 are further configured so that Young's modulus E, hardness Ht, and the value of ratio [E/Ht] of the foregoing are controlled to fall within predetermined ranges. More specifically, soft layer 14 has a Young's modulus E ranging from 6 to 30 GPa, hardness Ht ranging from 0.2 to 3.0 GPa, and the value of ratio [E/Ht] of the foregoing ranging from 10 to 30.

In contrast, COMPARATIVE EXAMPLE 1 is not provided with soft layer 14 and thus, the DLC layer serves as the surface of COMPARATIVE EXAMPLE 1. In COMPARATIVE EXAMPLES 2 to 4, the soft layer exists over the DLC layer. In COMPARATIVE EXAMPLE 2, the Young's modulus E and hardness Ht of the soft layer both exhibit large values and thus, the value of ratio [E/Ht] of the same is 5 which is a value less than 10. In COMPARATIVE EXAMPLE 3, the value of ratio [E/Ht] is 35 which is a value greater than 30. In COMPARATIVE EXAMPLE 4, the Young's modulus E of soft layer is 40 GPa which is a value greater than 30 GPa.

For EXAMPLES 1 to 12, the relation between the thickness T of soft layer 14 and hardness Hd of DLC layer 15 is also indicated in FIG. 4. More specifically, a value obtained by Hd×T is given when thickness T is equal to or less than 2 μm and a value obtained by Hd×(T−2) is given when thickness T is greater than 2 μm and equal to or less than 3.2 μm. As described earlier, EXAMPLES 7 to 12 satisfy the range represented by Hd×T≥6 when T≤2 and Hd×(T−2)≤6 when 2<T≤3.2. EXAMPLES 1 to 6 fall outside the specified range.

The ball-on-disc test is known in the art and thus, is described only briefly. The test was conducted by placing a rotating steel ball on an outer peripheral portion of the upper surface of a test piece rotating about a vertical axis. The steel ball was rotated in the same position and was placed on the test piece at a load of 1 N for example. The speed was varied while keeping the relative speed of the test piece and the steel ball at a constant speed of 500 mm/s for example. Thus, the speed of drawing the oil e.g. SAE#10 existing between the steel ball and the test piece was varied and friction coefficient at each drawing speed was measured. The test results are indicated in the chart of FIG. 4. The chart indicates friction coefficient μb in the boundary lubrication regime as well as drawing speed Vm from which friction coefficient μb started to decrease, i.e. friction coefficient μb decreased by 0.01.

As indicated in the test results, slide members 11 of EXAMPLES 1 to 12 are each provided with soft layer 14 having thickness T above DLC layer 15. Young's modulus E, hardness Ht, and the value of ratio [E/Ht] of soft layer 14 are controlled to fall within predetermined ranges. Each of slide members 11 of EXAMPLES 1 to 12 exhibit a relatively small friction coefficient μb in the boundary lubrication regime and friction coefficient μb starts to decrease at a relatively low drawing speed Vm. As a result, it was possible to make an early transition to the mixed lubrication regime.

In contrast, COMPARATIVE EXAMPLE 1 was not provided with a soft layer. Further, in COMPARATIVE EXAMPLES 2 to 4, either of Young's modulus E, hardness Ht, and the value of ratio [E/Ht] of soft layer 14 fell outside the predetermined ranges. In COMPARATIVE EXAMPLES 2 to 4, friction coefficient μb was relatively large in the boundary lubrication regime and thus, friction coefficient μb started to decrease at a relatively high drawing speed Vm.

It is believed that an appropriate initial conformability with the counter element was achieved in the boundary lubrication regime in slide members 11 of EXAMPLES 1 to 12 by the presence of soft layer 14 over DLC layer 15 having a predetermined hardness Hd. As a result, it was possible to significantly reduce the friction coefficient by inhibiting ploughing and adhesion. It is further believed that early transition to the mixed lubrication regime was achieved by specifying the Young's modulus E, hardness Ht, and the value of ratio [E/Ht] of the foregoing values of soft layer 14 to fall within the predetermined ranges. This is believed to have led to further reduction of the friction coefficient.

In COMPARATIVE EXAMPLE 2 in which the value of ratio [E/Ht] of the soft layer is less than 10 on the other hand, initial conformability is not achieved as wear is hardly observed because of excessive hardness. Thus, COMPARATIVE EXAMPLE 2 is less effective in reducing the friction coefficient in the boundary lubrication regime. In COMPARATIVE EXAMPLE 3 in which the value of ratio [E/Ht] is greater than 30, hardness Ht is too small relative to the Young's modulus. Thus, it is possible to achieve low friction coefficient in the boundary lubrication regime because of the relatively large degree of conformability, i.e. wear is observed. However, it is believed that oil film is difficult to form because of the difficulty in drawing the oil.

Among the EXAMPLES, a greater level of reduction was achieved in drawing speed Vm from which friction coefficient μb started to decrease in EXAMPLES 4 to 6 and EXAMPLES 10 to 12 in which the value of ratio [E/Ht] was equal to or greater than 20. Thus, it is believed that the value of ratio [E/Ht] preferably ranges from 20 to 30. Further, a greater level of reduction was achieved in friction coefficient μb in the boundary lubrication regime in EXAMPLES 7 to 12 in which the relation between thickness T of soft layer 14 and hardness Hd of DLC layer 15 was controlled to fall within the predetermined range as compared to EXAMPLES 1 to 6 falling outside the predetermined range. Similar test results were obtained when a material primarily comprising Al was employed as the bearing alloy layer.

The slide member of the present invention is not limited to the foregoing embodiments and EXAMPLES. For example, the materials used in the metal back and the bearing alloy layer as well as their thicknesses may vary. The DLC layer and the soft layer may be formed by different manufacturing methods. Further, each of the components may contain unavoidable impurities. Still further, the slide member is not limited to a slide bearing application for automobile engines but may be implemented in various other applications with modifications within the spirit of the invention.

The foregoing description and drawings are merely illustrative of the principles of the present invention and are not to be construed in a limited sense. Various changes and modifications will become apparent to those of ordinary skill in the art. All such changes and modifications are seen to fall within the scope of the invention as defined by the appended claims.

What is claimed is:

1. A slide member comprising:
 a substrate; and
 a slide layer provided in a surface side of the substrate, the slide layer including:
  a soft layer primarily comprising carbon and being provided in a surfacemost portion of the slide layer, the soft layer having a Young's modulus E ranging from 6 to 30 GPa, hardness Ht ranging from 0.2 to 3.0 GPa, and a value of ratio of Young's modulus E to hardness Ht given by E/Ht ranging from 10 to 30, and
  a diamond-like-carbon layer provided directly under the soft layer and having a hardness Hd ranging from 5 to 60 GPa.

2. The slide member according to claim 1, where Hd×T≥6 when T≤2 and Hd×(T−2)≤6 when 2<T≤3.2 when T represents a thickness μm of the soft layer and Hd represents a hardness GPa of the diamond-like-carbon layer.

* * * * *